United States Patent [19]
Imlach

[11] Patent Number: 5,641,179
[45] Date of Patent: Jun. 24, 1997

[54] BODY SIDE PROTECTOR FOR VEHICLES EQUIPPED WITH A TRUCK TOOL BOX

[76] Inventor: Alan G. Imlach, 131 Main St., Tupper Lake, N.Y. 12986

[21] Appl. No.: 505,679

[22] Filed: Jul. 21, 1995

[51] Int. Cl.$^6$ ............................................. B60R 19/02
[52] U.S. Cl. ........................... 280/770; 280/762; 293/128
[58] Field of Search ..................... 280/770, 762; 293/118, 128, 142; 296/39.2, 37.6, 183; 224/402, 403, 404; 150/166

[56] References Cited

U.S. PATENT DOCUMENTS

| | | | |
|---|---|---|---|
| 3,540,773 | 11/1970 | Settle, Jr. | 280/770 |
| 4,014,583 | 3/1977 | Forbes | 293/128 |
| 4,530,519 | 7/1985 | Marshall | 293/128 |
| 4,750,767 | 6/1988 | Barnett | 280/770 |
| 4,789,195 | 12/1988 | Fletcher | 296/37 |
| 4,967,944 | 11/1990 | Waters | 224/273 |
| 4,974,892 | 12/1990 | Huard | 280/770 |
| 4,997,227 | 3/1991 | Falzone et al. | 280/770 |
| 5,112,092 | 5/1992 | Pucci | 280/770 |
| 5,188,407 | 2/1993 | Villaveces et al. | 293/128 |
| 5,193,869 | 3/1993 | Land | 293/128 |
| 5,209,545 | 5/1993 | Slaugh | 296/136 |
| 5,257,848 | 11/1993 | Coletti et al. | 296/156 |
| 5,290,618 | 3/1994 | Olson et al. | 280/770 |

*Primary Examiner*—Robert J. Oberleitner
*Assistant Examiner*—Min Yu
*Attorney, Agent, or Firm*—Richard L. Miller, P.E.

[57] ABSTRACT

A body side protector for vehicles equipped with a truck tool box that prevents damage to the side of a truck when the truck tool box is accessed. The protector includes a resilient mat, a flexible magnet, at least one flexible strap, and a mounting bar. The resilient mat has a resilient mat front face, a resilient mat rear face, and a resilient mat top and contains at least one longitudinally disposed mat strap slot opening at the resilient mat top. The resilient mat readily conforms to and protects the specific contour of the side rail. The flexible magnet is attached to the resilient mat rear face so that the resilient mat is readily removably affixed to the specific contour of the side rail. The at least one flexible strap is disposed within a respective one of the at least one longitudinally disposed mat strap slots. Each of the at least one flexible strap has a flexible strap distal end that extends past the resilient mat top and contains a flexible strap distal end aperture. The mounting bar has a mounting bar front, a mounting bar back, and a mounting bar bottom. The mounting bar contains at least one longitudinally disposed mounting bar slot that opens at the mounting bar bottom. The mounting bar further contains at least one mounting bar aperture that is aligned with the flexible strap distal end aperture of a respective one of the at least one flexible strap.

20 Claims, 1 Drawing Sheet

U.S. Patent    Jun. 24, 1997    5,641,179
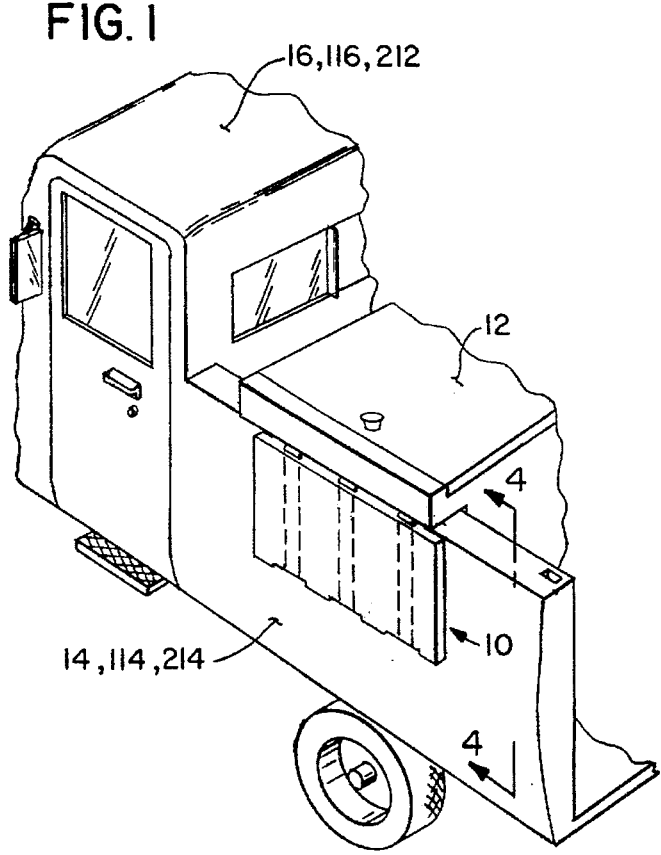
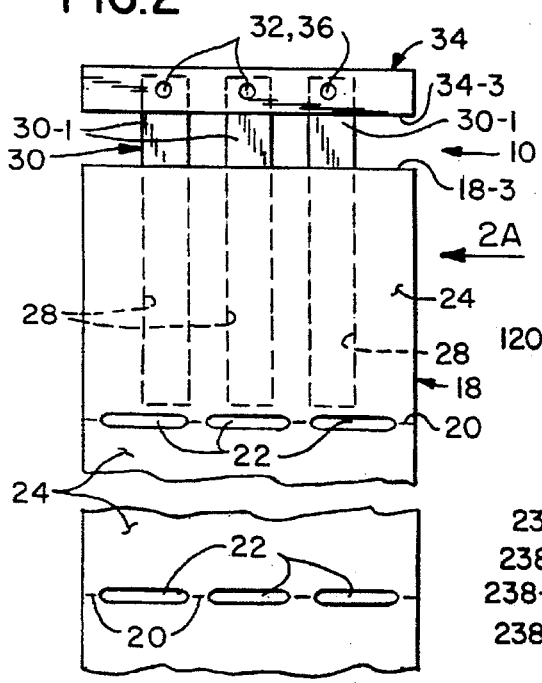
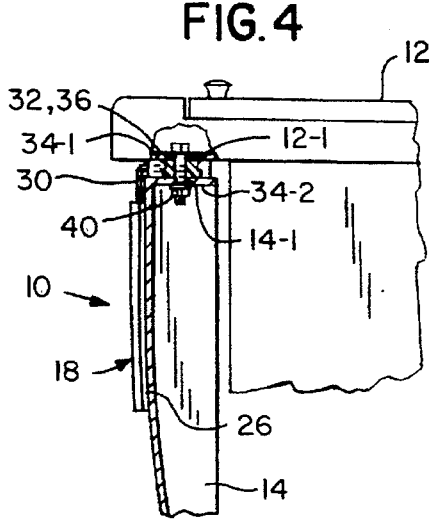
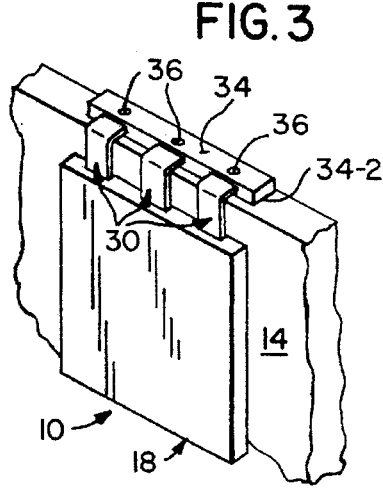
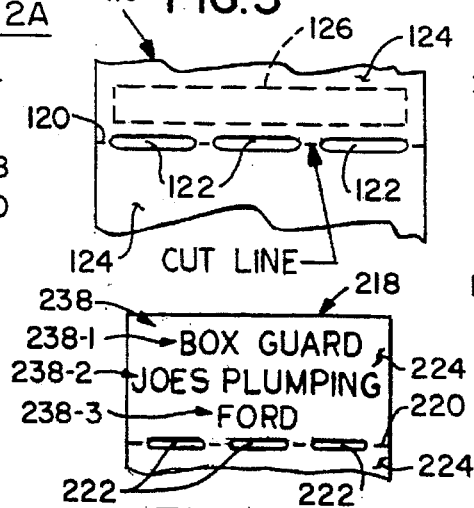

BODY SIDE PROTECTOR FOR VEHICLES EQUIPPED WITH A TRUCK TOOL BOX

BACKGROUND OF THE INVENTION

The present invention relates to a body side protector for vehicles. More particularly, the present invention relates to a body side protector for vehicles equipped with a truck tool box that is secured intermediate the tool box and the truck side rail by the tool box securing screws so that damage to the vehicle side body is eliminated when the tool box is accessed.

Pickup trucks comprise a large portion of the vehicles currently in use. One problem present in pickup trucks is that a minimum amount of enclosed space is provided for the protection and storage of tools and other valuable items. To provide for storage and transportation of items in a pickup truck, it is common to use tool or utility boxes which fit between the side panels behind the cab of the pickup truck. In order to readily access the contents of the tool box during use, a person would lean over the side of the pickup truck, causing possible damage to the side of the pickup truck from a tool belt or the like.

Numerous innovations for vehicle body side protectors have been provided in the prior art that will be described. However, even though these innovations may be suitable for the specific individual purposes to which they address, they differ from the present invention in that they do not teach a body side protector for vehicles equipped with a truck tool box that is secured intermediate the tool box and the truck side rail by the tool box securing screws so that damage to the vehicle side body is eliminated when the tool box is accessed.

For example, U.S. Pat. No. 5,209,545 to Slaugh teaches a protective off-highway covering for the exterior side wall surfaces of the body of an automotive vehicle. The covering is made in separate pieces, each of which being attached by fasteners to the longitudinal side of the pickup truck and extending from the top to the bottom of each panel.

Another example, U.S. Pat. No. 5,193,869 to Land teaches a body side protector that mounts between the front and rear fender wells by a "L"-shaped linkage. The "L"-shaped linkage has a stop to limit the movement of the body protection bar against the side of the vehicle when in place.

Finally, still another example, U.S. Pat. No. 5,188,407 to Villaveces et al. teaches a magnetic-strip, car door protector that includes an elongated main body portion that has an inner layer made of magnetic material for attaching the strip to a car door. A terminal flap is disposed on the inner magnetic layer that is inserted in the crack of the door.

It is apparent that numerous innovations for vehicle side protectors have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a body side protector for vehicles equipped with a truck tool box that avoids the disadvantages of the prior art.

Another object of the present invention is to provide a body side protector for vehicles equipped with a truck tool box that is simple and inexpensive to manufacture.

Still another object of the present invention is to provide a body side protector for vehicles equipped with a truck tool book that is simple to use.

Yet another object of the present invention is to provide a body side protector for vehicles equipped with a truck tool box that prevents damage to the side of a truck when the truck tool box is accessed.

Briefly stated, still yet another object of the present invention is to provide a body side protector for vehicles equipped with a truck tool box that includes a resilient mat, a flexible magnet, at least one flexible strap, and a mounting bar.

Yet still another object of the present invention is to provide a body side protector for vehicles equipped with a truck tool box wherein the resilient mat has a resilient mat front face, a resilient mat rear face, and a resilient mat top and contains at least one longitudinally disposed mat strap slot opening at the resilient mat top.

Still yet another object of the present invention is to provide a body side protector for vehicles equipped with a truck tool box wherein the resilient mat readily conforms to and protects the specific contour of the side rail.

Yet still another object of the present invention is to provide a body side protector for vehicles equipped with a truck tool box wherein the flexible magnet is attached to the resilient mat rear face so that the resilient mat is readily removably affixed to the specific contour of the side rail.

Still yet another object of the present invention is to provide a body side protector for vehicles equipped with a truck tool box wherein the at least one flexible strap is disposed within a respective one of the at least one longitudinally disposed mat strap slots.

Yet still another object of the present invention is to provide a body side protector for vehicles equipped with a truck tool box wherein each of the at least one flexible strap has a flexible strap distal end that extends past the resilient mat top and contains a flexible strap distal end aperture.

Still yet another object of the present invention is to provide a body side protector for vehicles equipped with a truck tool box wherein the mounting bar has a mounting bar front, a mounting bar back, and a mounting bar bottom.

Yet still another object of the present invention is to provide a body side protector for vehicles equipped with a truck tool box wherein the mounting bar contains at least one longitudinally disposed mounting bar slot that opens at the mounting bar bottom.

Still yet another object of the present invention is to provide a body side protector for vehicles equipped with a truck tool box wherein the mounting bar further contains at least one mounting bar aperture that is aligned with the flexible strap distal end aperture of a respective one of the at least one flexible strap.

Yet still another object of the present invention is to provide a body side protector for vehicles equipped with a truck tool box wherein the resilient mat has at least one laterally disposed cut line that contains at least one tear slot.

Still yet another object of the present invention is to provide a body side protector for vehicles equipped with a truck tool box wherein the at least one laterally disposed cut line divides the resilient mat into individual sections which can be readily selectively torn off to accommodate for the different heights of the side rails of different pickup trucks.

Yet still another object of the present invention is to provide a body side protector for vehicles equipped with a truck tool box wherein the flexible magnet covers the entirety of the resilient mat rear face.

Still yet another object of the present invention is to provide a body side protector for vehicles equipped with a truck tool box that further includes flexible magnet affixing apparatus for affixing the flexible magnet to the resilient mat rear face.

Yet still another object of the present invention is to provide a body side protector for vehicles equipped with a truck tool box wherein the flexible magnet affixing apparatus includes glue.

Still yet another object of the present invention is to provide a body side protector for vehicles equipped with a truck tool box wherein the at least one longitudinally disposed mat strap slot is three longitudinally disposed mat strap slots.

Yet still another object of the present invention is to provide a body side protector for vehicles equipped with a truck tool box wherein the at least one flexible strap is three flexible straps.

Still yet another object of the present invention is to provide a body side protector for vehicles equipped with a truck tool box wherein the at least one longitudinally disposed mounting bar slot is three longitudinally disposed mounting bar slots.

Yet still another object of the present invention is to provide a body side protector for vehicles equipped with a truck tool box wherein the at least one longitudinally disposed mat strap slot is contained within the upper most individual section of the individual sections of the resilient mat.

Still yet another object of the present invention is to provide a body side protector for vehicles equipped with a truck tool box that further includes strap mat affixing apparatus for affixing the at least one flexible strap into the at least one longitudinally disposed mat strap slot.

Yet still another object of the present invention is to provide a body side protector for vehicles equipped with a truck tool box wherein the strap mat affixing apparatus includes glue.

Still yet another object of the present invention is to provide a body side protector for vehicles equipped with a truck tool box wherein the strap mat affixing apparatus includes friction fit.

Yet still another object of the present invention is to provide a body side protector for vehicles equipped with a truck tool box wherein the flexible magnet covers a part of the resilient mat rear face intermediate an adjacent pair of the at least one laterally disposed cut line.

Still yet another object of the present invention is to provide a body side protector for vehicles equipped with a truck tool box that further includes printed matter disposed on the resilient mat front face.

Yet still another object of the present invention is to provide a body side protector for vehicles equipped with a truck tool box wherein the printed matter is selected from a group consisting of logo, company name, and truck brand.

Still yet another object of the present invention is to provide a body side protector for vehicles equipped with a truck tool box wherein the printed matter is disposed on the upper most individual section of the individual sections of the resilient mat.

Yet still another object of the present invention is to provide a body side protector for vehicles equipped with a truck tool box that further includes strap affixing apparatus for affixing the at least one flexible strap into a respective one of the at least one longitudinally disposed mounting bar slot.

Still yet another object of the present invention is to provide a body side protector for vehicles equipped with a truck tool box wherein the strap affixing apparatus includes glue.

Yet still another object of the present invention is to provide a body side protector for vehicles equipped with a truck tool box wherein the strap affixing apparatus includes friction fit.

Finally, still yet another object of the present invention is to provide a method for mounting a body side protector for vehicles equipped with a truck tool box that comprises the steps of positioning a mounting bar atop a side rail of said vehicle, bending at least one flexible strap downwardly from the mounting bar, positioning a resilient mat adjacent the side rail, removably affixing the resilient mat to the side rail by a magnet, positioning the tool box atop the mounting bar, passing screws through tool box mounting apertures, passing the screws through mounting bar apertures and aligned strap apertures, passing the screws through side rail apertures, and securing nuts to the screws so that the mounting bar is sandwiched intermediate the tool box and the side rail.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 a diagrammatic perspective view illustrating the instant invention installed on a vehicle equipped with a truck carrying chest;

FIG. 2 is an enlarged diagrammatic elevational view of a first embodiment of the instant invention per se;

FIG. 2A is a diagrammatic side elevational view taken in the direction of arrow 2A in FIG. 2, with parts broken away;

FIG. 3 is a diagrammatic perspective view, with parts broken away, without the carrying chest installed thereon;

FIG. 4 is a cross sectional view taken along line 4—4 in FIG. 1 with parts broken away;

FIG. 5 is a diagrammatic elevational view of a second embodiment of the instant invention with parts broken away; and FIG. 6 is a diagrammatic elevational view of a third embodiment of the instant invention with parts broken away.

LIST OF REFERENCE NUMERALS UTILIZED IN THE DRAWING

Preferred Embodiment 10 body side protector for vehicles equipped with a truck tool box of the present invention
12 carrying chest
12-1 chest mounting apertures
14 side rail
14-1 side rail apertures
16 pickup truck
18 resilient mat
18-1 resilient mat front face
18-2 resilient mat rear face
18-3 resilient mat top
20 plurality of laterally disposed cut lines
22 plurality of tear slots 24 individual sections
26 flexible magnet
28 plurality of longitudinally disposed mat strap slots
30 plurality of flexible straps
30-1 flexible mat strap distal ends
32 strap apertures
34 mounting bar
34-1 mounting bar front
34-2 mounting bar back
34-3 mounting bar bottom
35 plurality of longitudinally disposed mounting bar slots
36 plurality of mounting bar apertures
38 plurality of screws
40 plurality of nuts First Alternate Embodiment 114 side rail
116 pickup truck
118 resilient mat
118-2 resilient mat rear face
120 plurality of laterally disposed cut lines
122 plurality of tear slots
124 individual sections
126 flexible magnet Second Alternate Embodiment 214 side rail
216 pickup truck
218 resilient mat
218-1 resilient mat front face
220 plurality of laterally disposed cut lines
222 plurality of tear slots
224 individual sections
238 printed matter
238-1 "BOX GUARD" logo
238-2 company name
238-3 truck brand

DETAILED DESCRIPTION OF THE PREFERRED EMBODIMENT

Referring now to the figures in which like numerals indicate like parts, and particularly to FIG. 1, the body side protector for vehicles equipped with a truck tool box of the present invention is shown generally at 10 attached intermediate a carrying chest 12 and a side rail 14 of a pickup truck 16. The body side protector for vehicles equipped with a truck tool box 10 drapes over the side rail 14 and protects it from damage when the carry chest 12 is accessed.

The configuration of the body side protector for vehicles equipped with a truck tool box 10 can best be seen in FIGS. 2 and 2A, and as such, will be discussed with reference thereto.

The body side protector for vehicles equipped with a truck tool box 10 includes a resilient mat 18 that has a resilient mat front face 18-1, a resilient mat rear face 18-2, and a resilient mat top 18-3. The resilient mat 18 contains a plurality of laterally disposed cut lines 20, each of which positioned at a different elevation along the resilient mat 18. Each of the plurality of laterally disposed cut lines 20 contains a plurality of tear slots 22 that pass through the resilient mat 18. The plurality of tear slots 22 divide the resilient mat 18 into individual sections 24 which can be readily selectively torn off to accommodate for the different heights of the side rails 14 of different pickup trucks 16.

Positioned at the resilient mat rear face 18-2 and covering it in its entirety, is a flexible magnet 26. The flexible magnet 26 may be affixed to the resilient mat rear face 18-2 by any means conventional in the art, such as, but not limited to, glue.

A plurality of longitudinally disposed mat strap slots 28 are contained in the upper most individual section 24 of the resilient mat 18 and open at the resilient mat top 18-3.

Each of a plurality of flexible straps 30 is disposed within a respective one of the plurality of longitudinally disposed mat strap slots 28 by a means conventional in the art, such as, but not limited to, glue or friction fit. The plurality of longitudinally disposed flexible mat straps 30 have flexible mat strap distal ends 30-1 that extend past the resilient mat top 18-3 and contain strap apertures 32.

A mounting bar 34 has a mounting bar front 34-1, a mounting bar back 34-2, and a mounting bar bottom 34-3. A plurality of longitudinally disposed mounting bar slots 35 are contained in the mounting bar 34 and open at the mounting bar bottom 34-3. A plurality of mounting bar apertures 36 are contained in the mounting bar 34, each of which being in alignment with a respective one of the strap apertures 32.

The mounting of the body side protector for vehicles equipped with a truck tool box 10 can best be seen in FIGS. 3 and 4, and as such will be discussed with reference thereto.

As can be seen in FIG. 3, the body side protector for vehicles equipped with a truck tool box 10 is positioned with the mounting bar back 34-2 atop the side rail 14 and the resilient mat 18 adjacent to the side rail 14. By virtue of the flexibility of the plurality of flexible straps 30, the resilient mat 18 can readily achieve its required position and by virtue of the resiliency of the resilient mat 18, the resilient mat 18 can readily conform to the contour of and protect the side rail 14.

The required position of the flexible mat 18 is maintained by the magnet 26 which removably affixes the resilient mat 18 to the side rail 14 without damaging it while preventing the resilient mat 18 from moving due to wind or the like.

The carrying chest 12 is then positioned on the mounting bar front 34-1. A plurality of screws 38 are placed through carrying chest mounting apertures 12-1, through the plurality of mounting bar apertures 36 and the aligned strap apertures 32, and through the side rail apertures 14-1 where a plurality of nuts 40 are secured therearound. The plurality of nuts 40 secure the mounting bar 34 intermediate the carrying chest 12 and the side rail 14 in a sandwiching fashion.

The configuration of the first alternate embodiment of the resilient mat 118 can best be seen in FIG. 5, and as such, will be discussed with reference thereto.

The resilient mat 118 has a resilient mat rear face 118-2 and contains a plurality of laterally disposed cut lines 120, each of which positioned at a different elevation along the resilient mat 118. Each of the plurality of laterally disposed cut lines 120 contains a plurality of tear slots 122 that pass through the resilient mat 118. The plurality of tear slots 122 divide the resilient mat 118 into individual sections 124 which can be readily selectively torn off to accommodate for the different heights of the side rails 114 of different pickup trucks 116.

Positioned at the resilient mat rear face 118-2 and covering only a part of it, is a flexible magnet 126. The flexible magnet 126 may be affixed to the resilient mat rear face 118-2 by any means conventional in the art, such as, but not limited to, glue.

The configuration of the second alternate embodiment of the resilient mat 218 can best be seen in FIG. 5, and as such, will be discussed with reference thereto.

The resilient mat 218 has a resilient mat front face 218-1 and contains a plurality of laterally disposed cut lines 220, each of which positioned at a different elevation along the resilient mat 218. Each of the plurality of laterally disposed cut lines 220 contains a plurality of tear slots 222 that pass through the resilient mat 218. The plurality of tear slots 222 divide the resilient mat 218 into individual sections 224 which can be readily selectively torn off to accommodate for the different heights of the side rails 214 of different pickup trucks 216.

Positioned at the resilient mat front face 218-1 and on the upper most individual section 224, is printed matter 238. The printed matter may include "BOX GUARD" logo 238-1, company name 238-2, and truck brand 238-3, but is not limited to that.

It will be understood that each of the elements described above, or two or more together, may also find a useful application in other types of constructions differing from the types described above.

While the invention has been illustrated and described as embodied in a body side protector for vehicles equipped with a truck tool box, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A vehicle body protector adaptable to a side rail of a vehicle equipped with a tool box, comprising:
   a) a resilient mat having a resilient mat front face, a resilient mat rear face, and a resilient mat top, said resilient mat containing at least one longitudinally disposed mat strap slot opening at said resilient mat top, said resilient mat adapted to be readily conforming to and protecting the contour of said side rail;
   b) a flexible magnet attached to said resilient mat rear face so that said resilient mat can be readily removably affixed to said specific contour of said side rail;
   c) at least one flexible strap disposed within a respective one of said at least one longitudinally disposed mat strap slots, each of said at least one flexible strap having a flexible strap distal end extending past said resilient mat top and having a flexible strap distal end aperture through said end; and
   d) a mounting bar having a mounting bar front, a mounting bar back, and a mounting bar bottom, said mounting bar containing at least one longitudinally disposed mounting bar slot opening at said mounting bar bottom and receiving said flexible strap distal end of a respective one of said at least one flexible strap, said mounting bar further having at least one mounting bar aperture through said bar aligned with said flexible strap distal end aperture of a respective one of said at least one flexible strap.

2. The protector as defined in claim 1, wherein said resilient mat has at least one laterally disposed cut line that contains at least one tear slot, said at least one laterally disposed cut line divides said resilient mat into individual sections which can be readily selectively torn off to accommodate for the different heights of said side rails of different pickup trucks.

3. The protector as defined in claim 1, wherein said flexible magnet covers the entirety of said resilient mat rear face.

4. The protector as defined in claim 1, further comprising flexible magnet affixing means for affixing said flexible magnet to said resilient mat rear face.

5. The protector as defined in claim 4, wherein said flexible magnet affixing means includes glue.

6. The protector as defined in claim 1, wherein said at least one longitudinally disposed mat strap slot is three longitudinally disposed mat strap slots.

7. The protector as defined in claim 6, wherein said at least one flexible strap is three flexible straps.

8. The protector as defined in claim 7, wherein said at least one longitudinally disposed mounting bar slot is three longitudinally disposed mounting bar slots.

9. The protector as defined in claim 2, wherein said at least one longitudinally disposed mat strap slot is contained within the upper most individual section of said individual sections of said resilient mat.

10. The protector as defined in claim 1, further comprising strap mat affixing means for affixing said at least one flexible strap into said at least one longitudinally disposed mat strap slot.

11. The protector as defined in claim 10, wherein said strap mat affixing means includes glue.

12. The protector as defined in claim 10, wherein said strap mat affixing means includes friction fit.

13. The protector as defined in claim 2, wherein said flexible magnet covers a part of said resilient mat rear face intermediate an adjacent pair of said at least one laterally disposed cut line.

14. The protector as defined in claim 2, further comprising printed matter disposed on said resilient mat front face.

15. The protector as defined in claim 14, wherein said printed matter is selected from a group consisting of logo, company name, and truck brand.

16. The protector as defined in claim 2, wherein said printed matter is disposed on the upper most individual section of said individual sections of said resilient mat.

17. The protector as defined in claim 1; further comprising strap affixing means for affixing said at least one flexible strap into a respective one of said at least one longitudinally disposed mounting bar slot.

18. The protector as defined in claim 17, wherein said strap affixing means includes glue.

19. The protector as defined in claim 17, wherein said strap affixing means includes friction fit.

20. A method for mounting a body side protector for vehicles equipped with a truck tool box; comprising the steps of:
   a) positioning a mounting bar atop a side rail of said vehicle;
   b) bending at least one flexible strap downwardly from said mounting bar;
   c) positioning a resilient mat adjacent said side rail;
   d) removably affixing said resilient mat to said side rail by a magnet;
   e) positioning said tool box atop said mounting bar;
   f) passing screws through tool box mounting apertures;
   g) passing said screws through mounting bar apertures and aligned strap apertures;
   h) passing said screws through side rail apertures; and
   i) securing nuts to said screws so that said mounting bar is sandwiched intermediate said tool box and said side rail.

* * * * *